(12) United States Patent
Tsuzuki et al.

(10) Patent No.: US 7,711,214 B2
(45) Date of Patent: May 4, 2010

(54) SEMICONDUCTOR OPTICAL MODULATOR

(75) Inventors: Ken Tsuzuki, Zama (JP); Nobuhiro Kikuchi, Zama (JP); Eiichi Yamada, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 234 days.

(21) Appl. No.: 11/817,312

(22) PCT Filed: Mar. 8, 2006

(86) PCT No.: PCT/JP2006/304482

§ 371 (c)(1),
(2), (4) Date: Aug. 28, 2007

(87) PCT Pub. No.: WO2006/095776

PCT Pub. Date: Sep. 14, 2006

(65) Prior Publication Data

US 2009/0034904 A1 Feb. 5, 2009

(30) Foreign Application Priority Data

Mar. 8, 2005 (JP) .............................. 2005-064499
Mar. 8, 2005 (JP) .............................. 2005-064502
Sep. 16, 2005 (JP) .............................. 2005-270542

(51) Int. Cl.
*G02F 1/035* (2006.01)
(52) U.S. Cl. .......................................... 385/2; 359/248
(58) Field of Classification Search ................. 385/2–3; 359/248
See application file for complete search history.

(56) References Cited

U.S. PATENT DOCUMENTS 7,355,778 B2    4/2008    Tsuzuki et al.

(Continued)

FOREIGN PATENT DOCUMENTS

JP    2004-247121    9/2004

(Continued)

OTHER PUBLICATIONS

C. Rolland et al., *10 Gbit/s, 1.56 μm Multiquantum Well InP/InGaAsP Mach-Zehnder Optical Modulator*, Electronics Letters, vol. 29, No. 5, Mar. 4, 1993, pp. 471-472.

(Continued)

*Primary Examiner*—Jerry T Rahll
(74) *Attorney, Agent, or Firm*—Workman Nydegger

(57) ABSTRACT

There is provided a semiconductor optical modulator capable of performing a stable operation and having an excellent voltage-current characteristic to an electric field while exhibiting the characteristic of a semiconductor optical modulator with an n-i-n structure. The semiconductor optical modulator includes a waveguide structure that is formed by sequentially growing an n-type InP clad layer (11), a semiconductor core layer (13) having an electro-optic effect, a p-InAlAs layer (15), and an n-type InP clad layer (16). An electron affinity of the p-InAlAs layer (15) is smaller than an electron affinity of the n-type InP clad layer (16). In the waveguide structure having such a configuration, a non-dope InP clad layer (12) and a non-dope InP clad layer (14) may be respectively provided between the n-type InP clad layer (11) and the semiconductor core layer (13), and between the semiconductor core layer (13) and the p-InAlAs layer (15).

20 Claims, 12 Drawing Sheets

U.S. PATENT DOCUMENTS

2006/0159381 A1  7/2006  Tsuzuki et al.

FOREIGN PATENT DOCUMENTS

JP           2005-114868         4/2005

WO      WO 2004/081638 A1    9/2004

OTHER PUBLICATIONS

R. Spickermann et al., *GaAs/AlGaAs Travelling Wave Electro-optic Modulator with an Electrical Bandwidth > 40GHz*, Electronics Letters, vol. 32, No. 12, Jun. 6, 1996, pp. 1095-1096.

K. Tsuzuki et al., *40 Gbit/s n-i-n InP Mach-Zehnder Modulator with a π Voltage of 2.2V*, Electronics Letters, vol. 39, No. 20, Oct. 2, 2003, pp. 1464-1466.

(10 ps/div.)

SEMICONDUCTOR OPTICAL MODULATOR

TECHNICAL FIELD

The present invention relates to a semiconductor optical modulator, and more specifically, to a semiconductor optical modulator used in fields of an optical communication system and an optical information processing system.

BACKGROUND ART

With the recent development of highly-advanced information technology, the transmission of larger-volume information through a network such as the Internet has been demanded. An optical communication system and an optical information processing system have attracted attention as communication systems capable of transmitting large-volume information at high-speed.

Recently, a larger-capacity optical communication system and a larger-capacity optical information processing system have been developed in response to the above-described demand. In these optical communication system and optical information processing system, in order to perform a high-speed operation and to have a longer transmission distance, it is needed to use optical signals having less optical frequency chirping so as to make the effect of fiber dispersion, which is a cause of waveform deterioration, smaller. For this reason, recently, it has been a mainstream to use a configuration in which a light source at a DC operation and an external modulator are combined, so as to generate optical signals.

And now, a waveguide-type optical control device is one of key elements of the high-speed optical communication system and the optical information processing system. Of the waveguide-type optical control devices, an optical modulator is an essential device for converting an electric signal of a voice, an image, or the like into a level of light. The optical modulator is briefly classified into one using a dielectric such as LiNbO3 (LN) and one using a semiconductor such as InP or GaAs.

As a typical external modulator (optical modulator), a LiNbO3 (LN) modulator using a dielectric such as LiNbo3 (LN) has been widely used today. This operates with an electro-optic effect that a refractive index of a medium is changed by applying an electric field of direct current or an electric field with a frequency sufficiently lower than that of light.

The optical modulators using such an electro-optic effect include a phase modulator which modulates a phase of light by changing a refractive index of a dielectric having an electro-optic effect, and also include a light intensity modulator that is composed of phase modulator and a Mach-Zehnder interferometer. The Mach-Zehnder-type optical modulator can remove frequency chirping in principle, and therefore is a suitable modulator for ultra high-speed and long-distance communications.

However, since the conventional LN modulator is relatively long element length, the module size becomes large in addition a high driving voltage in a range from 3 to 5V is required. Furthermore, since a driving condition changes due to a DC drift (direct voltage drift) or a temperature drift, a control circuit is needed for a stable operation. In other words, there has been a problem in that a mechanism for controlling the driving condition is needed due to that change of the driving condition.

On the other hand, the optical modulators using a semiconductor include the following two typical modulators. One is an electroabsorption-type optical modulator (EA modulator) that uses an absorption edge shift toward a long wavelength side when an electric field is applied, such as a Franz-Keldysh Effect in a bulk semiconductor or a Quantum Confined Stark Effect (QCSE) in a multi-quantum well structure. The other one is an electro-optic modulator (EO modulator) that uses the electro-optic effect (Pockels effect) of changing a refractive index by applying an electric field.

The electroabsorption-type optical modulator (EA modulator) has attractive features such as small chip size, low-power consumption, and no DC drift that is seen in a LiNbO3 modulator. Consequently, it is expected to be promising. However, the electroabsorption-type optical modulator (EA modulator) has frequency chirping, and this chirping causes the deterioration of waveform occurs after optical fiber transmission. In other words, the frequency chirping causes the optical signal spectrum after the modulation to be wider than the optical signal spectrum before the modulation. When this optical signal with the widened spectrum is transmitted through the optical fiber, the deterioration of waveform due to the effect of dispersion of an optical fiber medium occurs, which results in causing a further unfavorable effect. This phenomenon of the waveform deterioration becomes more serious as a bit rate is higher and a transmission distance is longer.

On the other hand, as for the electro-optic modulator (EO modulator), a phase modulator that modulates a phase of light by changing a refractive index, and a Mach-Zehnder modulator that modulates light intensity with the formation of a Mach-Zehnder interferometer by combining it with the phase modulator, are in practical use. In today's optical communications, a signal is transmitted based on a level of the light intensity, and therefore the Mach-Zehnder modulator performing intensity modulation is mainly used. This Mach-Zehnder modulator can completely remove frequency chirping in principle, and therefore is greatly expected to be used as a modulator for ultra high-speed and long-distance communications. As an example of a semiconductor Mach-Zehnder modulator, there is disclosed in non-patent literature 1 a lumped optical modulator having a p-i-n structure. In the optical modulator disclosed in the non-patent literature 1, since it has the p-i-n structure and therefore a leak current is small, it is possible to effectively apply an electric field to a core layer.

In addition, there is disclosed a modulator using a Schottky electrode in non-patent literature 2. In the modulator disclosed in the non-patent literature 2, a wider electrical bandwidth is achieved by using a traveling-wave electrode structure as an electrode structure. In addition, in the non-patent literature 1, compared with these, a semiconductor Mach-Zehnder modulator with an n-i-n structure is discussed with a view to further achieving a lower voltage, miniaturization, and a higher speed.

Patent literature 1: WO 2004/081638 pamphlet: Non-patent literature 1: C. Rolland et al., "10 Gbit/s, 1.56 μm multiquantum well InP/InGaAsP Mach-Zehnder optical modulator," Electron, Lett., vol. 29, no. 5, pp. 471-472, 1993.

Non-patent literature 2: R. Spickerman et al., "GaAs/AlGaAs electro-optic modulator with bandwidth >40 GHz," Electron, Lett., vol. 31, no. 11, pp. 915-916, 1995.

DISCLOSURE OF THE INVENTION

However, with the optical modulator disclosed in the non-patent literature 1, the propagation loss of electric signal is high due to high resistance of a p-clad layer, and a high-speed operation is difficult, and furthermore, the light absorption of the p-clad layer is also high. As a result, it is difficult that the length of electro-optic interaction section to be set long for achieving a lower driving voltage. In addition, in the modulator disclosed in the non-patent literature 2, there is a problem in that an driving voltage is high.

Considering such a problem, there has been proposed the modulator having the n-i-n structure disclosed in the above patent literature 1. In the modulator disclosed in the above patent literature 1, the n-i-n structure is formed by sequentially growing an n-type clad layer, a core layer, and an n-type clad layer, and an electrode is provided on the upper n-type clad layer forming the n-i-n structure.

FIG. 11 is a cross-sectional diagram of a phase modulation waveguide of a conventional optical modulator having an optical waveguide with an n-i-n structure. It has a layered structure that is formed by sequentially growing an n-type clad layer 102, an optical waveguide core layer 103, a semi-insulating-type clad layer 104, and an n-type clad layer 105. The n-type clad layers 105 and 102 are respectively provided with electrodes 108 and 109 on top of them.

With such a configuration, a voltage is applied to the optical waveguide core layer 103 provided between the two n-type clad layers 102 and 105. With this configuration, similar to the p-i-n structure according to the non-patent literature 1, it is possible to effectively apply an electric field to the core layer. In addition, since an n-type is used for the clad layers, the propagation losses of electric signals and light due to the clad layers, which are caused in the p-i-n structure, can be reduced; a lower driving voltage can be achieved; and a sufficiently stable output compared with the p-i-n structure could be achieved. However, with the further development of the optical communication system, it has been demanded that the optical modulator outputs more stable.

However, in the optical modulator having the phase modulation waveguide with the n-i-n structure as in the patent literature 1, there have been problems as described below.

FIG. 12 is a diagram showing a waveguide band diagram of the optical modulator having the optical waveguide with the n-i-n structure. In the optical waveguide with the n-i-n structure, the light absorption is performed in the optical waveguide core layer 103, though the amount thereof is small. Therefore, as shown in FIG. 12, a hole 106-1 generated by the light absorption becomes a hole 106-2 accumulated in the semi-insulating-type clad layer 104 being a barrier layer. When this hole is accumulated, the barrier of the semi-insulating-type clad layer 104 for electrons is deteriorated, and a phenomenon that a leak current flows from then n-type clad layer 105 to then n-type clad layer 102 (parasitic phototransistor effect) is generated. In other words, as for the case of a transistor operation, there is generated the same state as a state where an emitter/base junction is subjected to forward bias if the base is in an open state and the hole density of the base increases.

Furthermore, with the effect of the forward bias generated by the accumulated hole 106-2, a voltage applied to the optical waveguide core layer 103 also decreases for the voltage equivalent to this forward bias. Consequently, there has been caused a problem in that modulation characteristics are changed depending on the light wavelength or light intensity which is inputted to the optical modulator. For example, when a wavelength is changed, it is needed to change a driving condition of the optical modulator. As a result, a control circuit is needed. In addition, when the light intensity becomes larger, the modulation characteristics are changed and deteriorated, and therefore, a light input level is needed to be controlled. To avoid the change and instability of the modulation characteristics, there has been caused a limitation that the optical modulator has to be used in ranges of the wavelength and light intensity such that the change would not make any distinction. As a result, a range that can be used as the optical modulator is limited.

As described above, the parasitic phototransistor effect that is caused by the accumulation of holes in the semi-insulating-type clad layer 104 being the barrier layer causes a problem in that the optical modulator having the phase modulation waveguide with the n-i-n structure is prevented from stable operation. One of the problems to be solved by the present invention is to provide a configuration achieving a stable operation of the optical modulator by suppressing the hole accumulation in the semi-insulating-type clad layer and the parasitic phototransistor effect and suppressing the change of the modulation characteristics caused thereby.

And now, to apply an electric field to the core layer with the n-i-n structure, a potential barrier for electrons for suppressing a leak current of the electrons is needed between the n-type clad layer and the core layer. However, in the optical modulator in the above patent literature 1, an Fe-doped semi-insulating layer is formed between the n-type clad layer on which the electrode is formed and the core layer, in order to form this potential barrier. However, with this configuration, the frequency of the modulation intensity disperses, which leads to cause an obstacle of stable output which is required nowadays.

Another problem to be solved by the present invention is to provide a semiconductor optical modulator capable of performing a stable operation and having an excellent voltage-current characteristic (high breakdown voltage, and low leak current) to an electric field, while exhibiting the characteristic of a semiconductor optical modulator with an n-i-n structure.

To achieve such an object, a first aspect of the present invention includes a waveguide structure that is formed by sequentially growing a first n-type semiconductor clad layer, a semiconductor core layer, a semiconductor clad layer, and a second n-type semiconductor clad layer, wherein an electron affinity of the semiconductor clad layer is smaller than that of the second n-type semiconductor clad layer.

In the first aspect, a heterojunction between the semiconductor clad layer and the second n-type semiconductor clad layer may be a type II heterojunction.

In the first aspect, a potential energy for a hole of the semiconductor clad layer may be smaller than a potential energy for a hole of the semiconductor core layer.

In addition, in the first aspect, a third n-type semiconductor clad layer having the potential energy for a hole smaller than the potential energy for a hole of the semiconductor clad layer may be inserted between the semiconductor clad layer and the second n-type semiconductor clad layer.

In addition, in the first aspect, a non-dope clad layer may be inserted between the first n-type semiconductor clad layer and the semiconductor core layer.

In addition, in the first aspect, a non-dope clad layer may be inserted between the semiconductor core layer and the semiconductor clad layer. The potential energy for a hole of the semiconductor clad layer may be smaller than the potential energy for a hole of the non-dope clad layer which is inserted between the semiconductor core layer and the semiconductor clad layer.

In addition, in the first aspect, the semiconductor may be InAlAs.

In addition, in the first aspect, the semiconductor clad layer may be doped to p-type.

In addition, in the first aspect, the waveguide structure may be a high-mesa waveguide structure or a ridge waveguide structure.

In addition, in the first aspect, there may be further included branching means for branching input light into two and respectively outputting the branched input light from two output terminals, the two output terminals being respectively connected with input terminals of the separate waveguide structures, and multiplexing means which is connected with each of the two waveguide structures and multiplexes the light outputted from the two waveguide structures to output.

In addition, in the first aspect, there may be provided a first electrode formed in a region on the first n-type semiconductor clad layer, which is a region where the semiconductor core layer is not formed, and a second electrode formed on the second semiconductor clad layer. The first and second electrodes may have a traveling-wave-type electrode structure.

A second aspect of the present invention includes a semiconductor optical waveguide layer that is formed by sequentially growing a first n-type semiconductor clad layer formed of n-type InP, a first non-dope clad layer formed of non-dope InP, a non-dope semiconductor core layer, and a second non-dope clad layer formed of non-dope InP, and a waveguide structure that is formed by sequentially growing a semiconductor clad layer formed of P-type InAlAs and a second n-type semiconductor clad layer formed of n-type InP.

A third aspect of the present invention is includes a semiconductor optical waveguide layer that is formed by sequentially growing a first n-type semiconductor clad layer formed of n-type InP, a first non-dope clad layer formed of non-dope InP, a non-dope semiconductor core layer, and a second non-dope clad layer formed of non-dope InP, and a waveguide structure that is formed by sequentially growing a semiconductor clad layer formed of p-type InAlAs, a second n-type semiconductor clad layer formed of n-type InP, and a third semiconductor clad layer formed of n-type InGaAsP or n-type InGaAlAs.

A fourth aspect of the present invention is a semiconductor optical modulator including a waveguide structure that is formed by sequentially growing a first n-type semiconductor clad layer, a semiconductor core layer, a semi-insulating-type semiconductor clad layer, and a second n-type semiconductor clad layer, the semiconductor optical modulator including at least one p-type semiconductor region that is a region having p-type conductivity and is formed on one portion or all of the second n-type semiconductor clad layer, with a section having a certain length in the light traveling direction of the waveguide structure, and an electrode that is formed on the p-type semiconductor region and is electrically connected with the p-type semiconductor region.

In the fourth aspect of the present invention, the p-type semiconductor region may be formed on one portions of the second n-type semiconductor clad layer and semiconductor clad layer coming into contact with the second n-type semiconductor clad layer, with a section having a certain length in the light traveling direction of the wavelength structure.

In addition, in the fourth aspect, the electrode is formed on the p-type semiconductor region and the second n-type semiconductor clad layer, and the p-type semiconductor region and the n-type semiconductor clad layer may be electrically connected commonly with the electrode.

In addition, in the fourth aspect, the waveguide structure may be a high-mesa waveguide structure or a ridge waveguide structure.

In addition, in the fourth aspect, there may be further included branching means for branching input light into two and respectively outputting the branched input light from two output terminals, the two output terminals being respectively connected with input terminals of the separate waveguide structures, and multiplexing means, which is connected with each of the two waveguide structures, for multiplexing light outputted from the two waveguide structures to output.

In addition, in the fourth aspect, a second electrode is further provided on a region on the first n-type semiconductor clad layer, which is a region where the semiconductor core layer is not formed, and the electrode is formed on the p-type semiconductor region and the second n-type semiconductor clad layer. The electrode and the second electrode may have a traveling-wave-type electrode structure.

In this manner, with the semiconductor optical modulator according to one embodiment of the present invention, there can be achieved a semiconductor optical modulator that has a low-loss and an excellent voltage-current characteristic to an electric field, is driven at low voltage, and operates stably. In other words, in one embodiment of the present invention, since the electron affinity of the semiconductor clad layer is set smaller than the electron affinity of the second n-type semiconductor clad layer, the semiconductor clad layer becomes a potential barrier for the electrons of the second n-type semiconductor clad layer. As a result, it has an excellent field resistance characteristic, and frequency dispersion due to intensity modulation is reduced or does not occur.

In addition, according to one embodiment of the present invention, one portion of the second n-type semiconductor clad layer coming into contact with the semiconductor clad layer (for example, semi-insulating-type clad layer) or one portions of the second n-type semiconductor clad layer and semiconductor clad layer are set to a p-type semiconductor region having p-type conductivity, so that holes generated by the light absorption are drawn from the electrode through the p-type semiconductor region. With this, it is prevented or reduced that a hole is accumulated in the semiconductor clad layer being the barrier layer. Accordingly, the generation of leak current and the decrease of voltage applied to the semiconductor core layer can be suppressed, and the change of modulation characteristic due to light absorption is suppressed, so that the stable operation of modulator can be achieved.

In the semiconductor electro-optic modulator (EO modulator) according to one embodiment of the present invention, a hole is not accumulated in the semiconductor clad layer (for example, a semi-insulating-type clad layer) being the barrier layer or the accumulation of the holes can be reduced. Consequently, the generation of leak current and the decrease of voltage applied to the core layer can be suppressed.

Thus, it becomes possible to achieve the stable operation of the modulator by improving conventional problems that modulation characteristics of optical modulator are changed depending on light wavelength or light intensity.

BEST MODE FOR CARRYING OUT THE INVENTION

Figure 1:
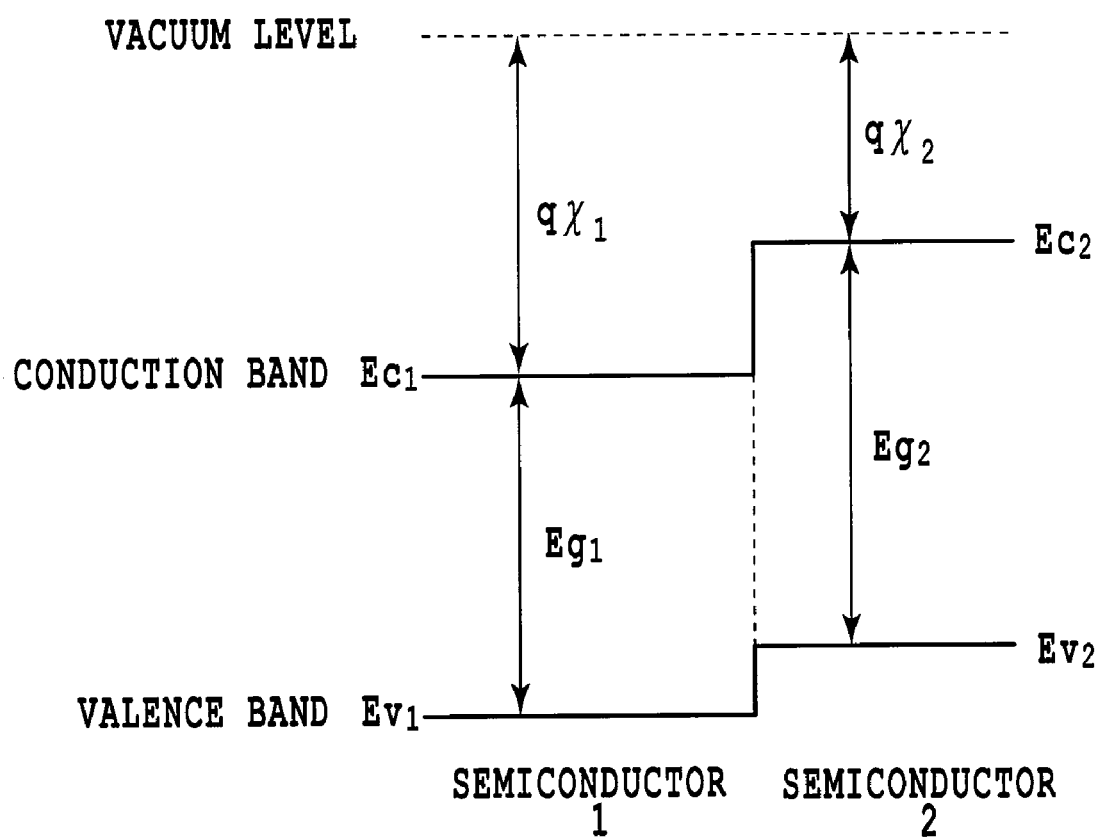
FIG. 1 is a band diagram of a type II heterojunction according to one embodiment of the present invention.

Preferred embodiments of the present invention will be described below by referring to accompanying drawings. It is to be noted that in the drawings described below, the same reference numerals are used to denote portions having the same functions and the duplicated description thereof will be omitted.

One embodiment of the present invention is a semiconductor optical modulator with an n-i-n structure that is formed with a first n-type semiconductor clad layer, a semiconductor optical waveguide layer having an electro-optic effect, which is formed on the first n-type semiconductor clad layer, a semiconductor clad layer formed on the semiconductor optical waveguide layer, and a second n-type semiconductor clad layer formed on the semiconductor clad layer. The semiconductor clad layer is a barrier layer (a potential barrier layer) for electrons from the second n-type semiconductor clad layer.

In one embodiment of the present invention, it is important to cause the barrier layer to function satisfactorily. In other words, it is important to reduce the adverse effect of holes, which are caused by light absorption in the semiconductor waveguide layer, to the barrier layer.

There is a possibility that the generated holes would be accumulated in the barrier layer. When they are accumulated in the barrier layer, there is a case of deteriorating the potential barrier for electrons. As a result, there is a possibility of causing the change of modulation characteristic depending on the intensity of light entering into the semiconductor waveguide layer, frequency dispersion in intensity modulation, or a leak current from the first n-type semiconductor layer to the second n-type semiconductor layer due to the deterioration of the potential barrier. For this reason, by reducing the effect caused in the barrier layer due to the fact that the holes generated in the semiconductor waveguide layer are accumulated in the barrier layer, it is possible to provide a semiconductor optical modulator capable of suppressing the change of the modulation characteristic and performing a stable operation.

In order to reduce the effect of the holes for the barrier layer, first to third embodiments are designed so that a conduction band discontinuity caused by an electron affinity would be caused between the semiconductor clad layer as the barrier layer and the second n-type semiconductor clad layer, so as to function as a satisfactory barrier for electrons even if the holes are accumulated in the barrier layer. In addition, to reduce the effect of the holes for the barrier layer, fourth and fifth embodiments are designed so that the potential barrier would be maintained or the deterioration of the potential barrier would be reduced even if the holes caused by light absorption flow into the barrier layer.

First Embodiment

In the semiconductor optical modulator of the present embodiment, a first n-type semiconductor clad layer, a semiconductor optical waveguide layer having an electronic-optic effect, a semiconductor clad layer, and a second n-type semiconductor clad layer are sequentially grown. Such a layer structure has an n-i-n structure, and the present embodiment is designed so that the semiconductor clad layer and the second n-type semiconductor clad layer would have a heterojunction and an electron affinity of the semiconductor clad layer would become smaller than an electron affinity of the second n-type semiconductor clad layer. By doing so, the semiconductor clad layer becomes a potential barrier for electrons of the second n-type semiconductor clad layer. With this, it is possible to achieve an optical modulator performing a more stable operation and having an excellent voltage-current characteristic (high breakdown voltage, and low leak current) to an electric field, without losing the characteristic of the semiconductor optical modulator with an n-i-n structure (reduction of light propagation loss, lower operation voltage, miniaturization, higher speed, and the like).

And now, the description will be given of a type II heterojunction. FIG. 1 shows a band diagram of this type II heterojunction. In the figure, $q\chi$ (q: elementary electron) is called an electron affinity, and is an energy required for taking electrons from the bottom of a conductor into vacuum. In addition, Eg is called a band gap, and is a difference between energies of the conductor and a valence electron band. The type II heterojunction means a case where the electron affinity of the semiconductor 2 is smaller than that of the semiconductor 1 and the sum of the electron affinity and energy gap of the semiconductor 2 ($q\chi+Eg$) is smaller than that of the semiconductor 1. Here, considering the electrons of the conductor, which have a tendency to flow from the semiconductor 1 side toward the semiconductor 2 side, the conductor band discontinuity ($\Delta Ec=Ec2-Ec1$) becomes a potential barrier, and therefore only the electrons having an energy to overcome the barrier can flow into the semiconductor 2. In other words, for the electrons flowing from the semiconductor 1 side to the semiconductor 2 side, this junction is a high resistance, and as the conductor band discontinuity is largely taken, the effect thereof becomes larger, which resulting in showing an excellent resistance characteristic.

Figure 2:
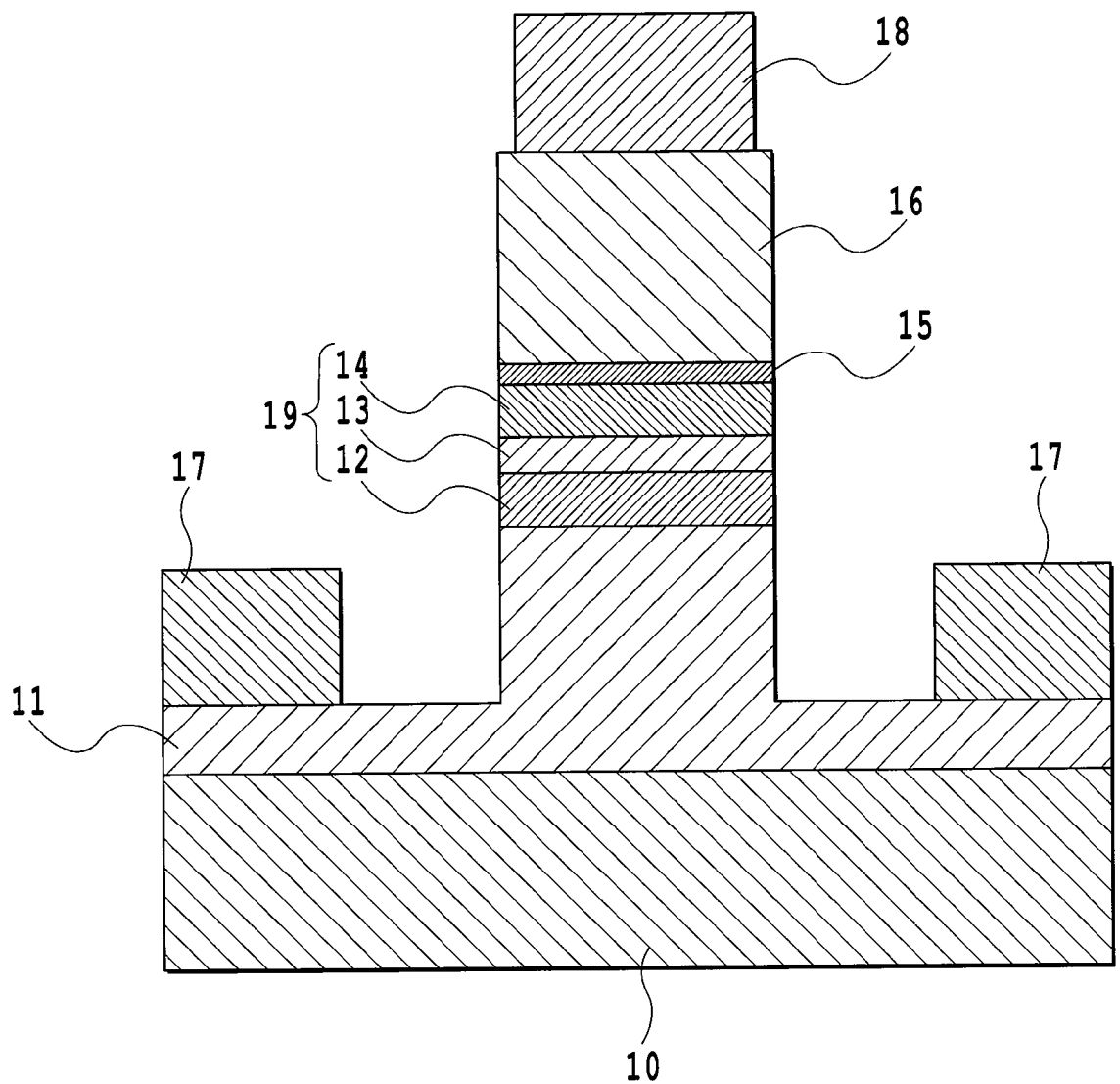
FIG. 2 is a diagram showing a cross section of a waveguide structure according to one embodiment of the present invention.
Figure 3:
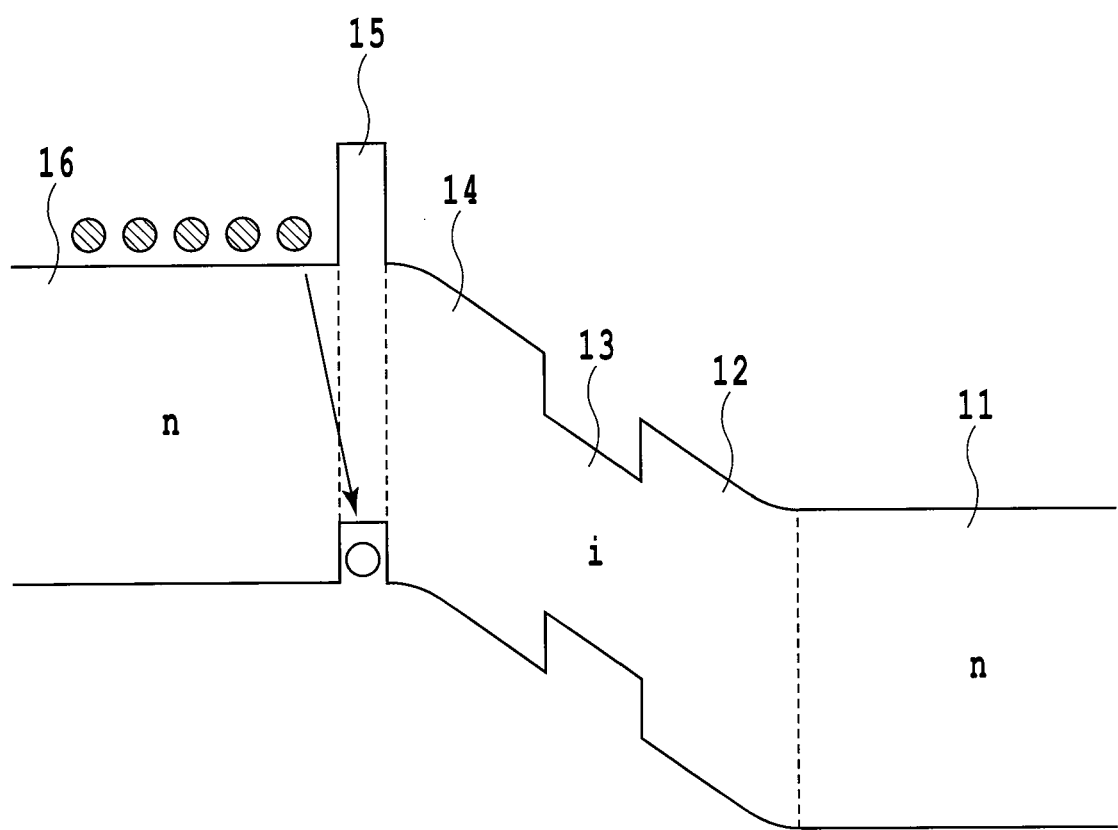
FIG. 3 is a diagram showing a band diagram of a waveguide according to one embodiment of the present invention.

FIG. 2 is a cross sectional diagram of the waveguide structure of the semiconductor optical modulator according to the present embodiment. FIG. 3 is a diagram showing a band diagram of the waveguide structure shown in FIG. 2.

In the semiconductor optical modulator according to the present embodiment, an n-InP clad layer (a first n-type semiconductor clad layer) 11, a semiconductor optical waveguide layer 19, a p-InAlAs layer (a semiconductor clad layer as a potential barrier layer) 15, an n-InP clad layer (a second n-type semiconductor clad layer) 16 are sequentially grown on a semi-insulating (SI)-InP substrate 10. In the semiconductor optical waveguide layer 19, a non-dope InP clad layer 12, a non-dope semiconductor core layer 13 having an electro-optic effect, and a non-dope InP clad layer 14 are grown, and the p-InAlAs layer 15 is grown on the upper portion of the InP clad layer 14.

Here, in the specification, "n-semiconductor" and "n-type semiconductor" are indicated a semiconductor doped with n-type dopant. A semiconductor doped with p-type dopant is also described like the semiconductor doped with n-type dopant.

For the semiconductor core layer 13, there can be used a structure having for example a multiquantum well layer and a separate-confinement heterostructure layer that has a band gap value larger than that of the multiquantum well structure on the upper and lower sides thereof (the InP clad layer 12 side and the InP clad layer 14 side of the semiconductor core layer 13) and smaller than that of the InP clad layers 12 and 14. In addition, a band gap wavelength of the multiquantum well layer is set so that the electro-optic effect would effectively operate in the light wavelength to be used and light absorption would not cause a problem.

In addition, the waveguide structure according to the present embodiment has a high-mesa waveguide structure as shown in FIG. 2, and to apply a voltage to the semiconductor optical waveguide layer 19, electrodes 17 and 18 are respectively provided on the upper portions of the n-InP clad layer 11 and the n-InP clad layer 16.

It is to be noted that in the present embodiment, as the waveguide structure, the high-mesa structure is used, but the present invention is not limited to this, and a ridge waveguide structure may be used.

And now, as is clear from the band diagram when a voltage is applied to the semiconductor optical modulator according to the present embodiment, which is shown in FIG. 3, the p-InAlAs layer 15 has an electron affinity smaller than that of the n-InP clad layer 16. Therefore, the conduction band discontinuity is caused in a heterointerface between them. As a result, a potential barrier for electrons of the n-InP clad layer is generated. In addition, the p-InAlAs layer 15 is a p-type and the n-InP clad layer 16 is an n-type. Therefore, in addition to the potential barrier caused by their heterointerface, a potential barrier by pn-junction is also generated. Thus, for the electrons implanted from the n-InP clad layer 16, these two elements function as a potential barrier as a whole.

In the present embodiment, as shown in FIG. 3, the heterojunction between the p-InAlAs layer 15 and the n-InP clad layer 16 is set to a type II heterojunction in which electrons and holes are entrapped in spatially different places. In addition, it is preferable to have a structure in which holes, which are slightly generated by the light absorption of the semiconductor optical waveguide layer, easily flow from the non-dope InP clad layer 14 side to the n-InP clad layer 16. In the present embodiment, in the junction between the non-dope InP clad layer 14 and the p-InAlAs layer 15, the potential energy for the holes of the p-InAlAs layer 15 is set smaller than the potential energy for the holes of the non-dope InP clad layer 14. In other words, it is preferable that in the junction between the semiconductor optical waveguide layer and the semiconductor clad layer as the potential barrier, the potential energy for the holes of the semiconductor clad layer be set smaller than the potential energy for the holes of the semiconductor optical waveguide layer. If a clad layer (in the present embodiment, the non-dope InP clad layer 14) is not provided between the semiconductor core layer and the semiconductor clad layer, a layer of the semiconductor optical waveguide layer, which comes into contact with the semiconductor clad layer, becomes the semiconductor core layer. In this case, it is only necessary that the potential energy for the holes of the semiconductor clad layer be set smaller than the potential energy for the holes of the semiconductor core layer in the junction between the semiconductor core layer and the semiconductor clad layer as the potential barrier layer.

And now, when the semiconductor optical modulator is in operation, electrons and holes are slightly generated by the light absorption in the semiconductor core layer 13. These electrons easily reach the n-InP clad layer 11, while the holes have a possibility of being accumulated in the vicinity of the p-InAlAs layer 15, which lowers the potential barrier of the p-InAlAs layer 15. This corresponds to the potential barrier by the pn junction to become smaller, and therefore, there is caused a possibility that the resistance characteristic cannot be sufficiently kept. However, in the structure according to the present invention, even when the potential barrier by the above-described pn junction becomes smaller, the conduction band discontinuity can still function as the potential barrier. As a result, the semiconductor optical modulator having an excellent resistance characteristic can be provided.

In other words, even if the holes generated in the semiconductor core layer 13 are accumulated in the p-InAlAs layer 15 being the barrier layer, the potential barrier by the conduction band discontinuity generated by setting the electron affinity of the p-InAlAs layer 15 to be smaller than that of the n-InP clad layer 16 preferably functions, though the potential barrier by the pn junction becomes smaller. Consequently, the leak current flowing from the n-InP clad layer 11 to the n-InP clad layer 16 side can be reduced. Since the potential barrier by this conduction band discontinuity satisfactorily functions regardless of the intensity or wavelength of light entering into the semiconductor core layer 13, a modulation operation can be stably performed even when the potential barrier by the pn junction changes according to the intensity or wavelength of the incident light.

In this manner, in the present embodiment, it is important to form a potential barrier that is not affected by accumulation of holes even when the holes are accumulated in the p-InAlAs layer (the semiconductor clad layer) 15 being the barrier layer. For this reason, in the present embodiment, the electron affinity of the p-InAlAs layer 15 as the semiconductor clad layer is set smaller than that of the n-InP clad layer 16 as the second n-type semiconductor clad layer.

And now, what is concerned about setting the p-InAlAs layer 15 to be a p-type is light absorption caused by inter-valence-band transition. However, it is not needed to take a thick film thickness since the conduction band discontinuity between the p-InAlAs layer 15 and the InP clad 14 is sufficiently large (a reference value is 0.39 eV). For example, if it is a 0.05-μm-the p-InAlAs layer 15, it is possible to have good voltage-current characteristic (high breakdown voltage, and low leak current) to about 15V. In addition, since an amount of the light absorption is proportional to a optical confinement factor of the p layer, it is possible to suppress losses caused by the light absorption by setting the p-InAlAs layer 15 not to have a thickness more than it is required and by distancing from the semiconductor core layer 13, that is, by setting the non-dope InP clad layer 14 to have a proper thickness. In this manner, in the present embodiment, there can be achieved a semiconductor optical modulator having an excellent voltage-current characteristic to an electric field, having a low-loss, and performing a stable operation without losing the characteristics of a semiconductor optical modulator with an n-i-n structure.

It is to be noted that in the present embodiment, as the semiconductor waveguide layer, the layer structure of the InP clad layer 12, the semiconductor core layer 13, and the InP clad layer 14 is used, but the present invention is not limited to this. In other words, although the non-dope InP clad layers 12 and 14 are provided in the upper and lower portions of the semiconductor core layer 13, it is also possible to have a structure with one of the InP clad layers 12 and 14 or with none of these. In the present embodiment, it is only needed to guide light, and as the semiconductor waveguide layer, there are included an embodiment with only the semiconductor core layer, or an embodiment in which the non-dope clad layer is provided in at least one of the upper and lower portions of the semiconductor core layer. In addition, the non-dope clad layers 12 and 14 are set to have a wider band gap than the semiconductor core layer 13. For example, it may be of course formed of an InGaAsP layer or InAlGaAs layer.

It is to be noted that the important thing in the present invention is to provide a potential layer by the conduction band discontinuity between the semiconductor optical waveguide and the second n-type semiconductor clad layer. Thus, in the present embodiment, the materials of the semiconductor clad layer and the second n-type semiconductor clad layer are respectively not limited to p-InAlAs and n-InP, and the materials of the semiconductor clad layer and the second n-type semiconductor clad layer may be selected so that the semiconductor clad layer and the second n-type semiconductor clad layer would be heterojunctioned and the electron affinity of the semiconductor clad layer would be smaller than that of the second n-type semiconductor clad layer. In addition, as for the semiconductor clad layer, there is no need to perform p-type doping as long as a potential barrier layer by the conduction band discontinuity can be formed.

In addition, considering the fact that a voltage applied to the waveguide structure according to the present embodiment is inverse bias, there is not a particular limitation for the semiconductor optical waveguide (in FIG. 2, the InP clad layer 14) and the semiconductor clad layer as the potential barrier layer. However, it is preferable that the electron affinity of the semiconductor clad layer be smaller than that of the semiconductor optical waveguide layer (in FIG. 2, the InP clad layer 14).

And now, to achieve a high-speed optical modulator, a traveling-wave-type electrode structure is useful. Accordingly, a traveling-wave-type electrode may be applied for the electrodes 17 and 18. In this traveling-wave-type electrode structure, in the optical modulator, impedance matching or speed matching of light and electricity become important. These impedance matching and speed matching become possible by controlling capacity components in the optical waveguide of the optical modulator. In other words, it becomes important to properly design a total thickness of the semiconductor optical waveguide layer 19 (the semiconductor core 13 and the non-dope InP clad layers 12 and 14 in the upper and lower portions thereof) being the non-dope layer and a waveguide width.

As a specific condition of the impedance matching, a range of error from 50Ω, which is specific impedance of an external electronic circuit, to ±10Ω is allowable. In general, an optical modulator is required to be capable of being driven by a low voltage. Consequently, it is preferable that a total thickness of the non-dope layer be as thin as possible (by doing so, the capacity becomes larger) as long as a light containment coefficient of the non-dope layer does not become extremely small. On the contrary, the characteristic impedance of the optical modulator is qualitatively inversely proportional to a square root of the capacity. As a result, when the non-dope layer is exceedingly thin, the characteristic impedance becomes exceedingly small. A method to avoid this is to narrow a width of the semiconductor optical waveguide, but if it is exceedingly narrowed, there is a possibility of causing increase in a light propagation loss and decrease in yields.

On the other hand, a frequency band depending on a degree of the velocity matching is shown by the following expression.

$$\Delta f \text{1.4} C/\pi |n_{opt} - n_\mu| L \qquad \text{[Formula 1]}$$

Here, C is a light speed, nopt is a group index, nμ is a refractive index of microwave and L is an electrode length.

The group index nopt of light is in a range from 3.4 to 3.7, and a range of the allowable refractive index of microwave is determined by a predetermined frequency band and the electrode length. For example, a band is set to 40 GHz and the electrode length is set to 3 mm, a difference between the group index of light and the refractive index of microwave becomes in a range of ±1.1. It is to be noted that if the capacity of the semiconductor optical waveguide layer is qualitatively caused to be larger, the speed of electricity becomes slower. In other words, the refractive index of microwave becomes larger. Considering all of the above-listed conditions to be fulfilled, it is preferable that the waveguide width of light be in a range from 1.2 μm to 2.5 μm and the total thickness of the non-dope layer (semiconductor optical waveguide layer) be in a range from 0.4 μm to 2.0 cm.

EXAMPLE

In an example to be described below, InP was used for the first and second n-type semiconductor clad layers. A p-type InAlAs layer (p-InAlAs layer 16) was used for the semiconductor clad layer functioning as a potential barrier for electrons, and a layer thickness was set to 0.05 μm and doping density was set to 1×1018 cm-3. In addition, a total thickness of the semiconductor optical waveguide 19, that is, the non-dope layer was set to 0.9 μm, and a width of the semiconductor optical waveguide layer 19 was set to 1.6 μm.

Figure 4:
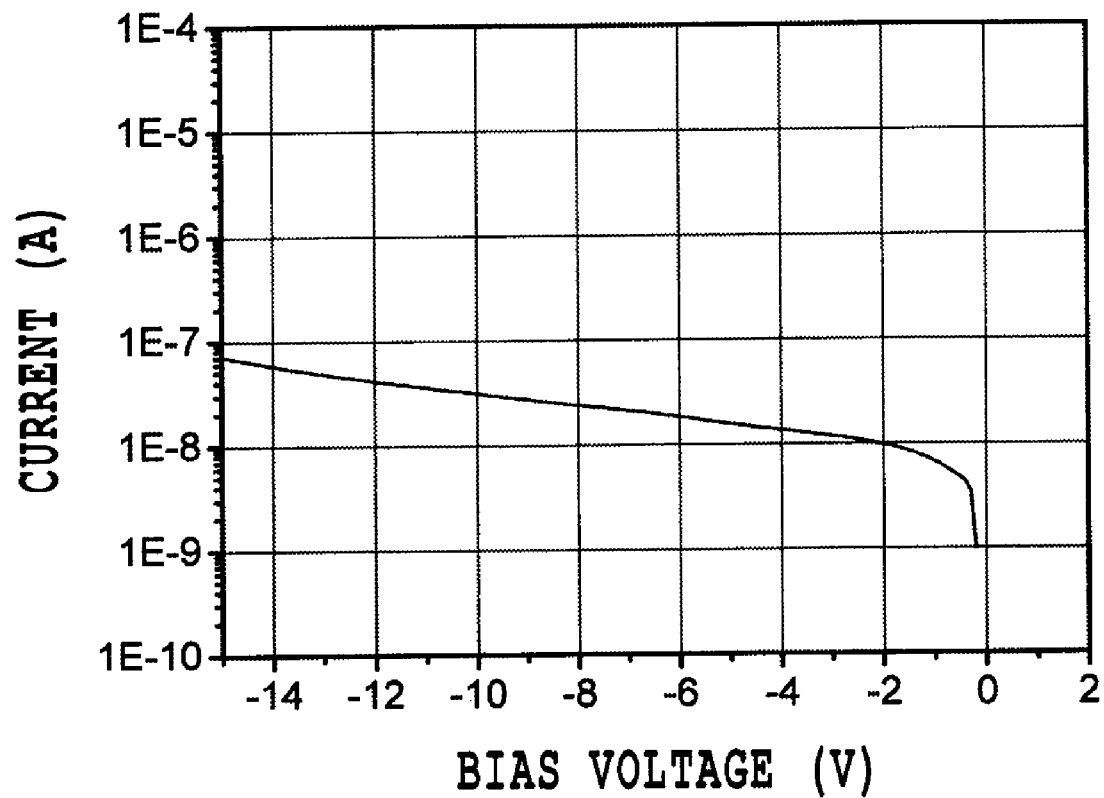
FIG. 4 is a graph showing a voltage-current characteristic when inverse bias is applied to the waveguide structure, according to one embodiment of the present invention.
Figure 5:
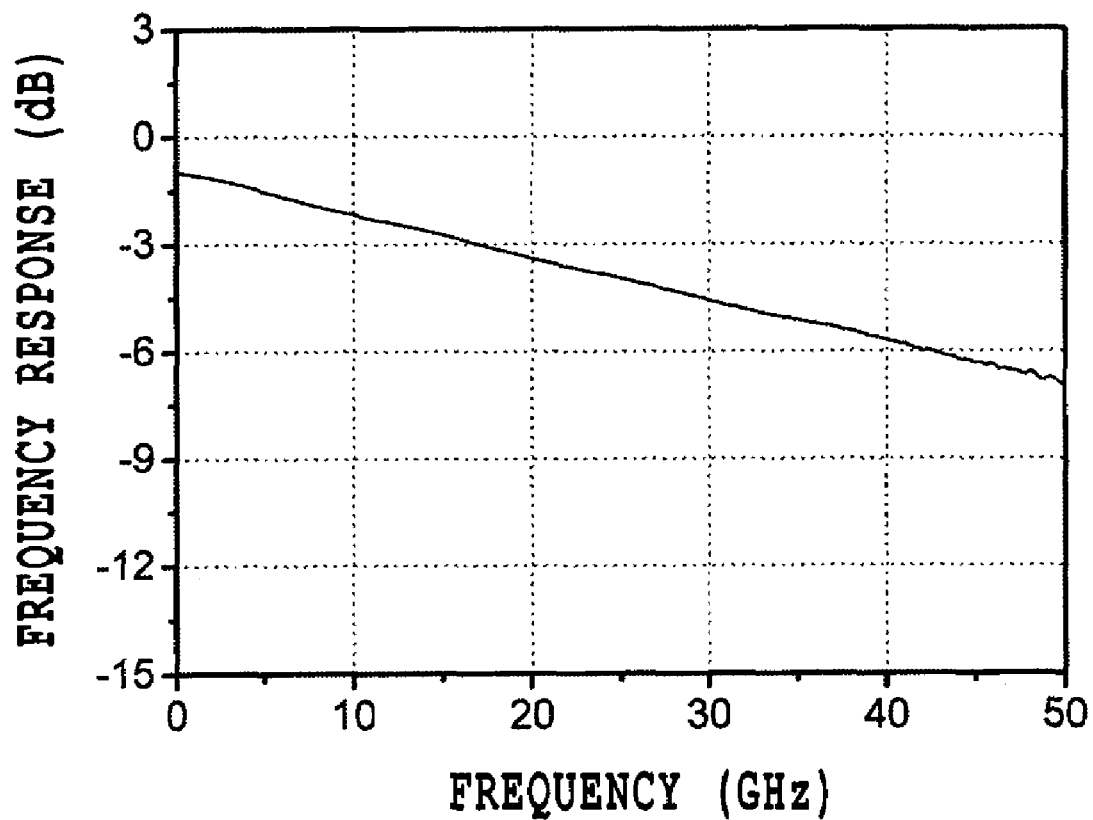
FIG. 5 is a graph showing an E/E high-frequency response characteristic when the length of a phase modulation region of Mach-Zehnder modulator is 3 mm, according to one embodiment of the present invention.
Figure 6:
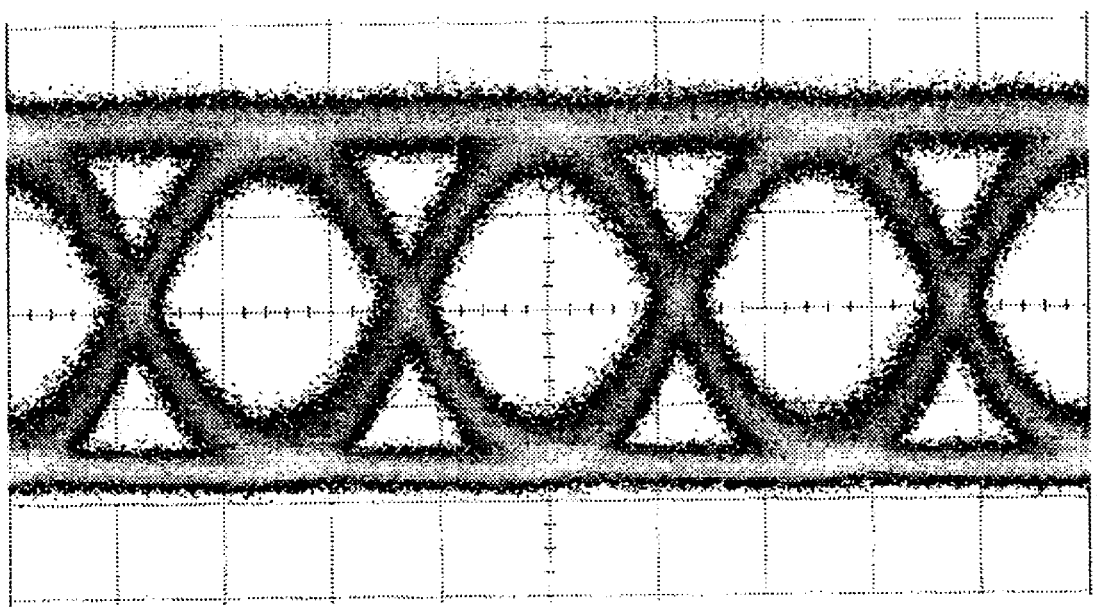
FIG. 6 is a diagram showing an eye-diagram of 40 Gbit/s of the Mach-Zehnder modulator under push-pull operation, according to one embodiment of the present invention.

FIGS. 4 to 6 show the characteristic of the Mach-Zehnder modulator manufactured by using the above parameters. FIG. 4 is a graph showing a voltage-current characteristic in a case where a negative voltage (inverse bias) is applied to the electrode 18 between the electrodes 17 and 18. As is clear from FIG. 4, it is seen that the sufficient voltage-current characteristic of 15V or more is shown.

In addition, FIG. 5 shows an E/E high-frequency response characteristic with a length of a phase modulation region being 3 mm. From FIG. 5, it is seen that 6 dB-down frequency bandwidth is 40 GHz or more, which has a sufficient bandwidth for the modulation of 40 Gbit/s.

Furthermore, FIG. 6 is an eye diagram of 40 Gbit/s in the push-pull operation when the driving voltage is 1.3 Vpp. From FIG. 6, clear eye openings can be recognized. In this manner, it can be seen that the Mach-Zehnder modulator according to the present embodiment is useful as a high-speed optical modulator.

Second Embodiment

Figure 7:
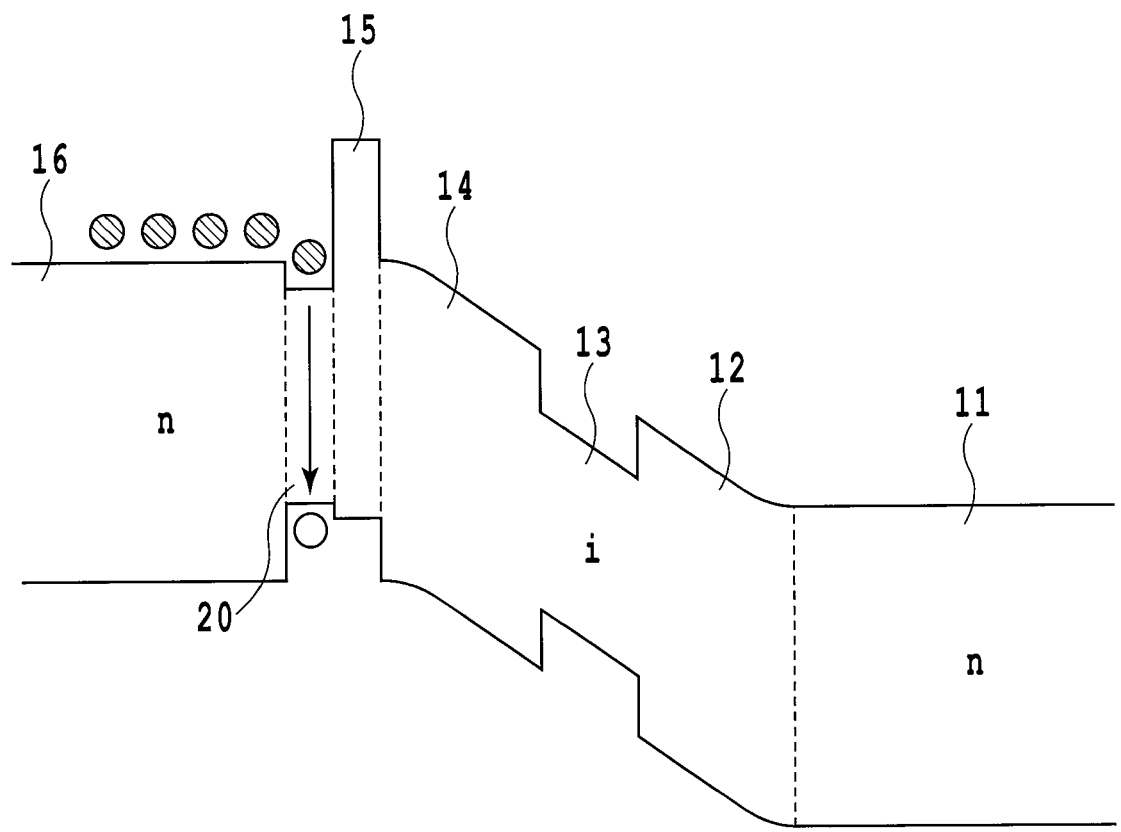
FIG. 7 is a diagram showing a band diagram of a waveguide according to one embodiment of the present invention.

FIG. 7 is a diagram showing a band diagram of a waveguide structure of the semiconductor optical modulator according to the present embodiment.

A basic structure of the semiconductor optical modulator according to the present embodiment is the same as that of the first embodiment, and the description thereof will be omitted. A point of the present embodiment different from that of the first embodiment is that a third n-type semiconductor clad layer 20 having a potential energy for holes, which is smaller than that of an n-InP clad layer 16 being a second n-type semiconductor clad layer, is inserted between the n-InP clad layer 16 being the second n-type semiconductor clad layer and a p-InAlAs layer 15 being a potential barrier layer. This third n-type semiconductor clad layer 20 can be formed by properly setting compositions by, for example, an InGaAsP layer, an InGaAlAs layer, and the like.

With this, the holes in a semiconductor core layer 13, which are slightly caused in operation by the light absorption, become easy to drop into the second n-type semiconductor clad layer 20 without being accumulated in the P-InAlAs layer 15. The dropped holes can be quickly recombined with electrons in the third n-type semiconductor clad layer 20, so that the deterioration of the potential barrier by the accumulation of the holes can be suppressed. In other words, with this configuration, it is possible to provide a semiconductor optical modulator having an excellent voltage-current characteristic to an electric filed and performing a stable operation.

Third Embodiment

In the present embodiment, the description will be given of the Mach-Zehnder optical modulator using the waveguide structure (phase modulation waveguide) described in the first and second embodiments. A Mach-Zehnder optical modulator 40 according to the present embodiment is provided with the waveguide structure described in the first and second embodiments.

Figure 8:
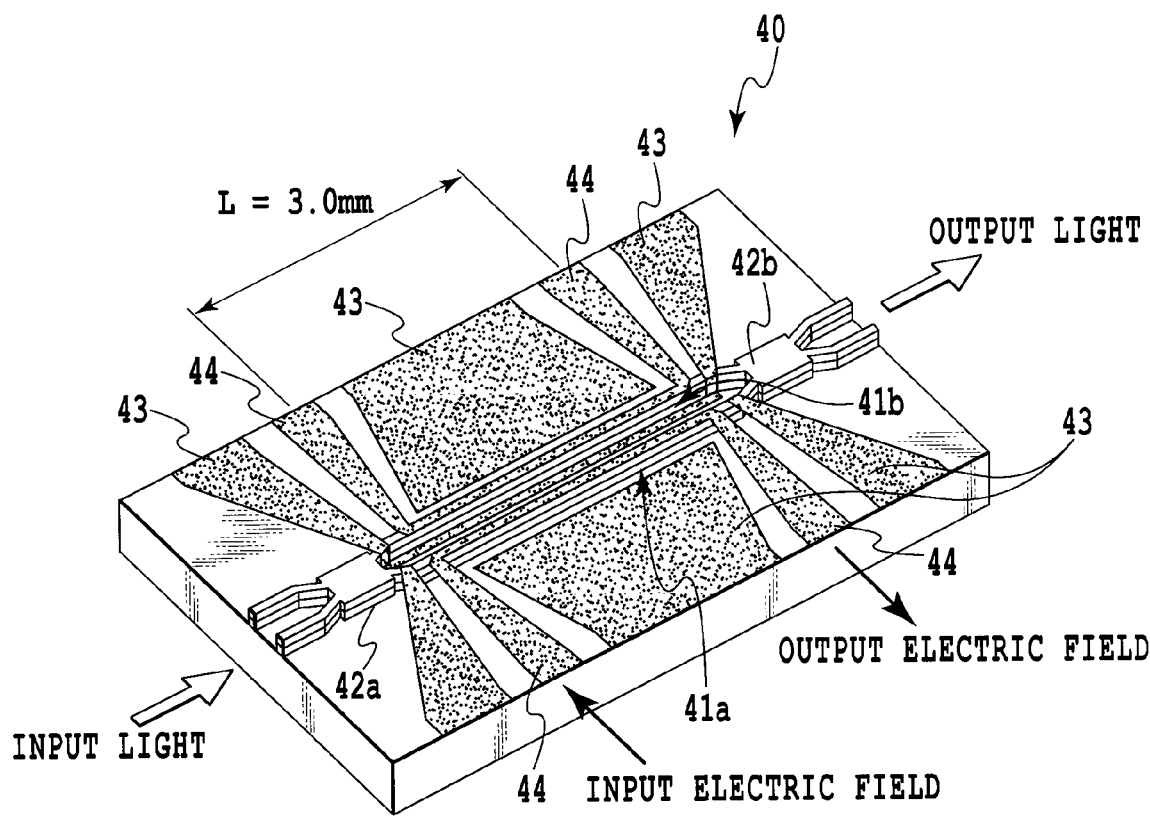
FIG. 8 is a schematic diagram of a Mach-Zehnder modulator according to one embodiment of the present invention.

In FIG. 8, two output terminals of a Multi-Mode Interference (MMI) coupler 42a as means for branching input light into two are respectively connected with phase modulation waveguides 41a and 41b according to one embodiment of the present invention. The output terminals of the phase modulation waveguides 41a and 41b are respectively connected with two input terminals of the MMI coupler 42b as means for multiplexing the two of the input light. In addition, an electrode 43 is provided in a predetermined region of a first n-type semiconductor clad layer formed on a substrate, and an electrode 44 is provided in a predetermined region on the phase modulation waveguides 41a and 42b. In the present embodiment, a length L (phase modulation region) of the phase modulation waveguides 41a and 41b is set to 3 mm.

In such a configuration, when the input light is inputted from one of the input terminals of the MMI coupler 42a, the input light is branched by the MMI coupler 42a, and each of the branched input lights is guided to the phase modulation waveguides 41a and 41b. At this time, a phase of the branched input light passing through the phase modulation waveguides 41a and 41b is modulated based on a voltage applied by the electrodes 43 and 44 to the phase modulation regions of the phase modulation waveguides 41a and 41b. The modulated light is multiplexed by the MMI coupler 42b and is outputted from one of the output terminals of the MMI coupler 42b.

According to the present embodiment, it is possible to provide the Mach-Zehnder type optical modulator having an excellent voltage-current characteristic to an electronic field and performing a stable operation without losing the characteristics of a semiconductor optical modulator with an n-i-n structure.

Fourth Embodiment

A light modulation waveguide that is used for an optical modulator according to the present embodiment uses one portion of a second n-type semiconductor clad layer coming into contact with a semi-insulating-type clad layer as a semiconductor clad layer (barrier layer), or one portion of the second n-type semiconductor clad layer and semi-insulating-type clad layer (semiconductor clad layer) as a p-type semiconductor region having p-type conductivity. A plurality of the p-type semiconductor regions are repeatedly provided in a light traveling direction of the optical modulator waveguide. Holes generated by the light absorption of input light in the semiconductor optical waveguide layer are drawn from an electrode which is in common with the second n-type semiconductor clad layer through the p-type semiconductor region. With this, it is possible that the holes are prevented from being accumulated in the semi-insulating-type clad layer being the barrier layer or they are reduced. Since the accumulation of the holes can be prevented or be reduced, it becomes possible to suppress the generation of a leak current or the deterioration of a voltage applied to a light wavelength core layer.

Accordingly, it becomes possible to achieve a stable operation of the modulator by improving the problem that the modulation characteristic is changed depending on the wavelength or intensity of light inputted to the optical modulator, which is an object of the present invention.

Figure 9:
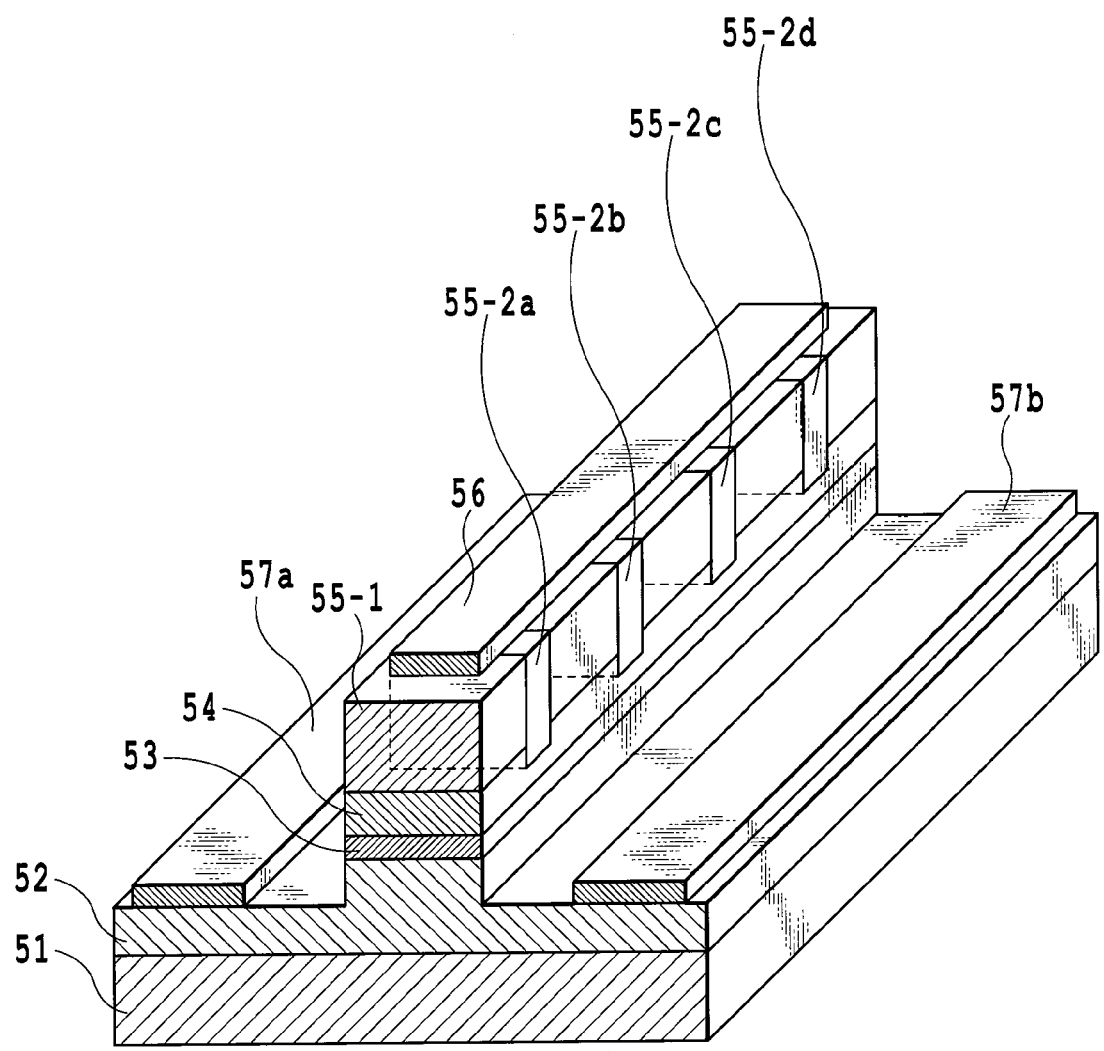
FIG. 9 is a diagram showing the waveguide structure of the optical modulator according to one embodiment of the present invention.

FIG. 9 is a structure of a waveguide of a semiconductor optical modulator formed according to the present embodiment. It has a layered structure in which an n-InP clad layer 52 (first n-type semiconductor clad layer), a semiconductor core layer 53, a semi-insulating-type clad layer (a semiconductor clad layer as a potential barrier layer) 54, and an n-InP clad layer (second n-type semiconductor clad layer) 55-1 are sequentially grown on a semi-insulating InP substrate 51. In the light modulation waveguide portion, one portions of the n-InP clad layer 55-1 coming into contact with the semi-insulating clad layer 54 and semi-insulating-type clad layer 54, with a section having a certain length in a light traveling direction, are used as p-type semiconductor regions 55-2a to 55-2d having p-type conductivity. There is provided an electrode 56 that is electrically connected commonly with the p-type semiconductor regions 55-2a to 55-2d and the n-InP clad layer 55-1. This p-type semiconductor region is repeatedly arranged in the light traveling direction throughout the entire light modulation waveguide. In FIG. 9, it is repeatedly arranged at a certain interval, but the present invention is not limited to a certain interval. In other words, it may be arranged at random intervals. In addition, in FIG. 9, there are only four of the p-type semiconductor regions, but the number thereof is not limited to four, and a large number of the p-type semiconductor regions are repeatedly arranged throughout the entire light modulation waveguide.

It is to be noted that in the present embodiment, as a waveguide structure, the high-mesa waveguide structure is used, but the present invention is not limited to this, and a ridge waveguide structure may be used.

The p-type semiconductor regions 55-2a to 55-2d can be formed for example in such a manner that layers from the n-InP clad layer 52 to the n-InP clad layer 55-1 are grown, and thereafter portions equivalent to the p-type semiconductor regions 55-2a to 55-2d are removed by etching, and then the p-type InP semiconductor region is regrown. In addition, they can be also formed by introducing a Be acceptor by ion implantation into one portion of the n-InP clad layer 55-1. However, it is desirable that the p-type semiconductor regions 55-2a to 55-2d do not go through to the semiconductor core layer 53. A length in the light traveling direction of the p-type semiconductor region may be set to for example 50 μm or less. In addition, an interval between the p-type semiconductor regions may be set to for example 200 μm or less.

On the n-InP clad layer 55-1 and the n-InP clad layer 52, the electrode 56 and the electrodes 57a and 57b, each of which is a metal electrode, are respectively arranged. The electrode 56 is set to a negative polarity in contrast with the electrodes 57a and 57b, and a voltage is applied to the semiconductor core layer 53. The electrode 56 commonly takes electric contact with both of the n-InP clad layer 55-1 and the p-type semiconductor regions 55-2a to 55-2d.

In order to reduce the effect of holes generated by the light absorption in the semiconductor core layer 53 to the semi-insulating-type clad layer 54 being the barrier layer, the present embodiment is designed so that the holes would flow into the electrode 56 through the p-type semiconductor regions 55-2a to 55-2d. In this manner, since the holes flow into the electrode 56, the holes are not accumulated in the semi-insulating-type clad layer 54 any more or the accumulation thereof can be reduced. As a result, since the accumulation to the semi-insulating-type clad layer 54 can be prevented or be reduced, the potential barrier of the semi-insulating clad layer 54 can be maintained or the deterioration of the potential barrier can be reduced.

In the present embodiment, the electrode 56 functions as means for absorbing the holes in addition to functioning as means for applying an electric signal by applying a voltage to the semiconductor core layer. At this time, in order for the electrode 56 to function to absorb the holes, a path through which the holes pass is required between the semi-insulating-type clad layer 54 and the electrode 56, and the p-type semiconductor regions 55-2a to 55-2d function as such a path. In other words, with the electrode 56 and the p-type semiconductor regions 55-2a to 55-2d, the holes in the semi-insulating-type clad layer 54 move toward outside the semi-insulating-type clad layer 54, so that the effect of the holes to the semiconductor clad layer (semi-insulating clad layer 54) being the barrier layer can be reduced.

It is to be noted that it is preferable that the p-type semiconductor regions 55-2a to 55-2d and the electrode 56 be brought into contact with each other in order to cause the p-type semiconductor regions to function as the path (the path for absorbing the holes from the semi-insulating-type clad layer) which goes from the semi-insulating-type clad layer 54 to the electrode 56. In addition, in FIG. 9, the p-type semiconductor regions 55-2a to 55-2d are formed on one portion of the semi-insulating-type clad layer 54, but the present invention is not limited to this. In other words, in the present embodiment, the important things are to flow the holes in the semi-insulating-type clad layer 54 to the electrode 56 and to cause the p-type semiconductor regions 55-2a to 55-2d to function as the above-described path for the holes. Thus, the p-type semiconductor regions may be formed so as to come in contact with the semi-insulating-type clad layer 54 without forming the p-type semiconductor regions up to one portion of the semi-insulating-type clad layer 54. In addition, it may be not necessary that the p-type semiconductor regions come in contact with the semi-insulating-type clad layer 54 as long as the p-type semiconductor regions 55-2a to 55-2d properly function as the path for the holes.

In addition, in the present embodiment, the electrode for applying an electric signal and the electrode for absorbing the holes are commonly used. In other words, the electrode 56 has a function to apply an electric signal and a function to absorbing the holes. By commonly using the electrode in this manner, the apparatus can be simplified and a manufacturing process can be simplified, therefore it is preferable. However, the present invention is not limited to this, and an electrode for applying an electric signal and an electrode for absorbing holes may be separately provided. For example, an electrode for absorbing holes may be provided on a side of the n-InP clad layer 55-1, where the electrode 56 is not formed.

Figure 12:
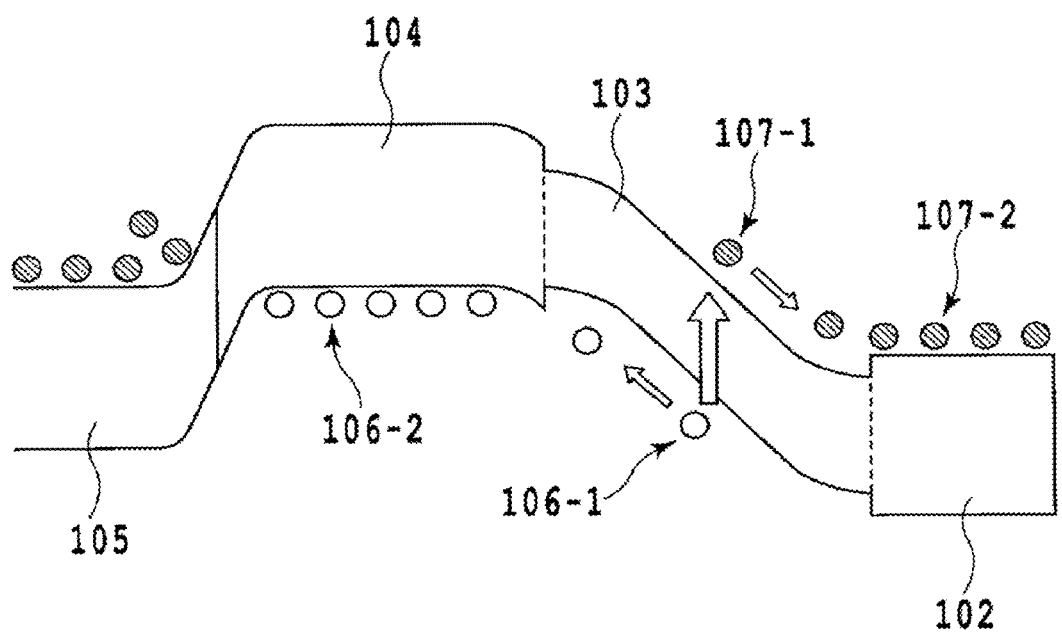
FIG. 12 is a waveguide layer band diagram of a conventional optical modulator with an n-i-n structure.

By using the optical waveguide with the above-described structure as the light modulation waveguide, the optical modulator will be operated as follows. Light is entered in a direction perpendicular to the cross-section (end-face) of the mesa structure shown in FIG. 9, and is penetrated into the light modulation waveguide. In this state, an electric signal is entered into the electrode 56 to apply an electric signal voltage between the n-InP clad layer 52 and the n-InP clad layer 55-1. A Fe atom doped in the semi-insulating-type clad layer 54 functions as deep acceptor. For this reason, as described in FIG. 12, it raises the energy of valence band and works as a potential barrier for electrons. With this potential barrier, the electron injection from the n-InP clad layer 55-1 is suppressed. As a result, the electric signal voltage is applied to the semiconductor core layer 53 in a state where the generation of leak current flowing from the electrodes 57a and 57b is low, so that the modulation of light phase can be performed based on an electro-optic effect.

Next, the description will be given of the operations of the p-type semiconductor regions 55-2a to 55-2d, which show an effect particular to the present embodiment. The n-type semiconductor regions 55-2a to 55-2d which are electrically connected commonly with the n-InP clad layer 55-1, have the following effects. In other words, in a conventional optical modulation waveguide structure, as described in FIG. 12, a parasitic phototransistor effect occurs due to holes accumulated by the light absorption of the semiconductor core layer 53. However, with the p-type semiconductor regions 55-2a to 55-2d which are characteristic portions of the present invention, the holes flow from the semi-insulating-type clad layer 54 being the barrier layer to the p-type semiconductor regions 55-2a to 55-2d, so that the accumulation of the holes in the semi-insulating-type clad layer 54 being the barrier layer can be suppressed. Accordingly, the above-described parasitic phototransistor effect can be suppressed and the change of the modulation characteristic of the optical modulator can be suppressed.

It is to be note that in the present embodiment, a plurality of p-type semiconductor regions is arranged, but the present invention is not limited to this, and it may be designed so that only one p-type semiconductor region would be arranged. Since it is important in the present embodiment to establish a path in which holes flow from an insulating-type clad layer (semiconductor clad layer) to an electrode, the number of the p-type semiconductor regions is not essential as long as the path is established. In other words, in the present embodiment, it is only necessary to arrange at least one p-type semiconductor region.

However, as shown in FIG. 9, when the plurality of p-type semiconductor regions are arranged, as for a region in the n-InP clad layer 55-1 where the p-type semiconductor regions 55-2a to 55-2d are not formed, the holes present in a region far from a certain p-type semiconductor region are absorbed from the p-type semiconductor region next to the certain p-type semiconductor region, so that the holes can be uniformly absorbed all over the light modulation wave guide portion. Thus, it is preferable that the plurality of p-type semiconductor regions be arranged.

Fifth Embodiment

Figure 10:
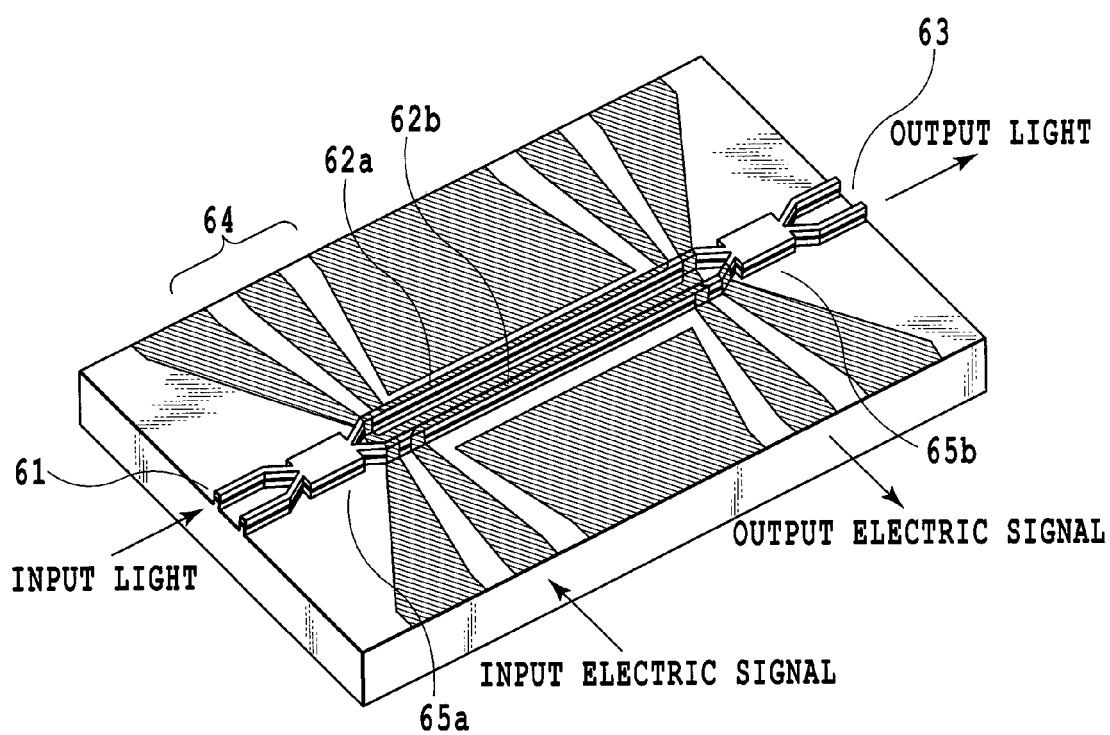
FIG. 10 is a configurational diagram of the Mach-Zehnder modulator according to one embodiment of the present invention.
Figure 11:
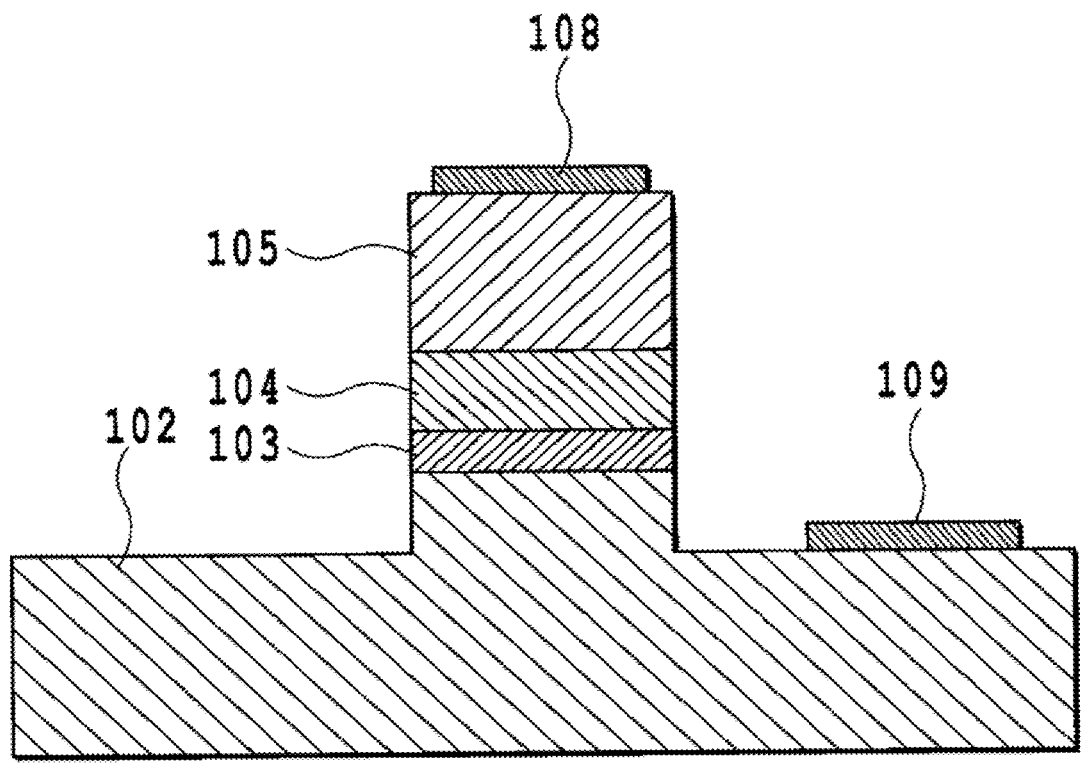
FIG. 11 is a cross sectional diagram of a waveguide of a conventional optical modulator with an n-i-n structure.

FIG. 10 is a schematic diagram of the semiconductor Mach-Zehnder modulator according to the present embodiment. The Mach-Zehnder modulator has two optical waveguides with an n-i-n structure. One portion of the two optical waveguides includes phase modulation waveguides 62a and 62b, and the waveguide structure of the semiconductor optical modulator shown in FIG. 9 is used in the phase modulation waveguides 62a and 62b. The phase modulation waveguides 62a and 62b are respectively connected with optical multiplexers/demultiplexers 65a and 65b in two places. The optical multiplexer/demultiplexer 65a is further connected with an input waveguide 61 and the other optical multiplexer/demultiplexer 65b is further connected with an output waveguide 63. Light is entered into the input waveguide 61 and is outputted from the output waveguide 63.

With the Mach-Zehnder interferometer having the above-described configuration, it becomes possible to modulate the light intensity. In other words, the input light entered from one of the input waveguides 61 is branched into the two phase modulation waveguides 62a and 62b by the optical multiplexer/demultiplexer 65a. After performing the phase modulation in each of the phase modulation waveguides 62a and 62b, the light is optically multiplexed again by the optical multiplexer/demultiplexer 65b. The phase of the light signal in the waveguide is modulated by changing refractive indexes of the phase modulation waveguides 62a and 62b with the electric signals inputted from a coplanar waveguide. The signal light whose phase is modulated by the phase modulation waveguides 62a and 62b are interfered and multiplexed by the optical multiplexer/demultiplexer 65b and outputted as the output light whose intensity is modulated from one of the output waveguides 63. In order to perform high-speed light modulation, the electrode applying a high-frequency electric field being a modulation signal uses the structure of the coplanar waveguide 64.

The phase modulation waveguides 62a and 62b use the light modulation waveguide with the n-i-n structure having the p-type semiconductor regions typical to the present invention, which is described in the fourth embodiment. In the semiconductor phase modulation waveguides 62a and 62b according to the present embodiment, the p-type semiconductor regions are provided in one portion of the optical waveguide, so that the holes are not accumulated in the semi-insulating-type clad layer being the barrier layer or the accumulation of the holes is reduced. Consequently, the parasitic phototransistor effect is not generated or the generation thereof can be suppressed, so that the generation of leak current or the deterioration of voltage applied to the optical waveguide core layer can be suppressed. As a result, it becomes possible to achieve a stable operation of the modulator by improving the problem that the modulation characteristic is changed depending on the wavelength or intensity of light entered into the optical modulator.

The invention claimed is:

1. A semiconductor optical modulator comprising:
 a waveguide structure formed by sequentially growing
  a first n-type semiconductor clad layer,
  a semiconductor core layer,
  a semiconductor clad layer, and
  a second n-type semiconductor clad layer,
 wherein an electron affinity of the semiconductor clad layer is smaller than an electron affinity of the second n-type semiconductor clad layer.

2. The semiconductor optical modulator according to claim 1, wherein a heterojunction between the semiconductor clad layer and the second n-type semiconductor clad layer is a type II heterojunction.

3. The semiconductor optical modulator according to claim 1, wherein a potential energy for a hole of the semiconductor clad layer is smaller than a potential energy for a hole of the semiconductor core layer.

4. The semiconductor optical modulator according to claim 1, wherein a third n-type semiconductor clad layer with a potential energy for a hole being smaller than that of the semiconductor clad layer, is inserted between the semiconductor clad layer and the second n-type semiconductor clad layer.

5. The semiconductor optical modulator according to claim 1, wherein a non-dope clad layer is inserted between the first n-type semiconductor clad layer and the semiconductor core layer.

6. The semiconductor optical modulator according to claim 1, wherein a non-dope clad layer is inserted between the semiconductor core layer and the semiconductor clad layer.

7. The semiconductor optical modulator according to claim 6, wherein a potential energy for a hole of the semiconductor clad layer is smaller than a potential energy for a hole of the non-dope clad layer.

8. The semiconductor optical modulator according to claim 1, wherein the semiconductor clad layer is InAlAs.

9. The semiconductor optical modulator according to claim 1, wherein the semiconductor clad layer is doped to be a p-type layer.

10. The semiconductor optical modulator according to claim 1, wherein the waveguide structure is one of a high-mesa waveguide structure and a ridge waveguide structure.

11. The semiconductor optical modulator according to claim 1, further comprising:
 branching means for branching input light into two and outputting each of the branched input lights from two output terminals, the two output terminals each connected with input terminals of the separate waveguide structures; and
 multiplexing means, which is connected with each of the two waveguide structures, for multiplexing lights outputted from the two waveguide structures to output.

12. The semiconductor optical modulator according to claim 1, further comprising:
 a first electrode formed in a region on the first n-type semiconductor clad layer, which is a region where the semiconductor core layer is not formed; and
 a second electrode formed on the second semiconductor clad layer, wherein the first and second electrodes have a traveling-wave-type electrode structure.

13. A semiconductor optical modulator comprising:
 a semiconductor optical waveguide layer that is formed by sequentially growing a first n-type semiconductor clad layer formed of n-type InP, a first non-dope clad layer formed of non-dope InP, a non-dope semiconductor core layer, and a second non-dope clad layer formed of non-dope InP; and
 a waveguide structure that is formed by sequentially growing a semiconductor clad layer formed of p-type InAlAs and a second n-type semiconductor clad layer formed of n-type InP.

14. A semiconductor optical modulator comprising:
 a semiconductor optical waveguide layer that is formed by sequentially growing a first n-type semiconductor clad layer formed of n-type InP, a first non-dope clad layer formed of non-dope InP, a non-dope semiconductor core layer, and a second non-dope clad layer formed of non-dope InP; and
 a waveguide structure that is formed by sequentially growing a semiconductor clad layer formed of p-type InAlAs, a third n-type semiconductor clad layer formed of one of n-type InGaAsP and n-type InGaAlAs, and a second n-type semiconductor clad layer formed of n-type InP.

15. A semiconductor optical modulator having a waveguide structure that is formed by sequentially growing a first n-type semiconductor clad layer, a semiconductor core layer, a semi-insulating-type semiconductor clad layer, and a second n-type semiconductor clad layer, the semiconductor optical modulator comprising:

at least one p-type semiconductor region which is a p-type semiconductor region being a region having p-type conductivity and is formed on at least one portion or all of the second n-type semiconductor clad layer, with a section having a certain length in a light traveling direction of the waveguide structure; and an electrode which is formed on the p-type semiconductor region and is electrically connected with the p-type semiconductor region.

16. The semiconductor optical modulator according to claim 15, wherein the p-type semiconductor region is formed on one portion of the second n-type semiconductor clad layer and semiconductor clad layer coming into contact with the second n-type semiconductor clad layer, with a section having a certain length in a light traveling direction of the waveguide structure.

17. The semiconductor optical modulator according to claim 15, wherein the electrode is formed on the p-type semiconductor region and the second n-type semiconductor clad layer, and the p-type semiconductor region and the n-type semiconductor clad layer are electrically connected commonly with the electrode.

18. The semiconductor optical modulator according to claim 15, wherein the waveguide structure is one of a high-mesa waveguide structure and a ridge waveguide structure.

19. The semiconductor optical modulator according to claim 15, further comprising:

branching means for branching input light into two and outputting the branched input light from two output terminals, the two output terminals each connected with input terminals of two separate ones of the waveguide structures; and multiplexing means, which is connected with each of the two waveguide structures, for multiplexing light outputted from the two waveguide structures to output.

20. The semiconductor optical modulator according to claim 15, further comprising a second electrode formed in a region on the first n-type semiconductor clad layer, which is a region where the semiconductor core layer is not formed, wherein the electrode is formed on the p-type semiconductor region and the second n-type semiconductor clad layer, and the electrode and the second electrode have a traveling-wave-type electrode structure.

* * * * *